United States Patent [19]

Ramharack

[11] Patent Number: 4,876,149
[45] Date of Patent: * Oct. 24, 1989

[54] MAGNETIC RECORDING MEDIA AND A METHOD USING A STABLE FLUID REACTIVE DISPERSION IN PREPARING MAGNETIC RECORDING MEDIA

[75] Inventor: Roopram Ramharack, St. Paul, Minn.

[73] Assignee: Minnesota Mining and Manufacturing Company, St. Paul, Minn.

[*] Notice: The portion of the term of this patent subsequent to Jun. 6, 2006 has been disclaimed.

[21] Appl. No.: 892,248

[22] Filed: Jul. 31, 1986

[51] Int. Cl.$^4$ ............................................. G11B 5/70
[52] U.S. Cl. ............................ 428/425.9; 427/128; 427/372.2; 428/329; 428/522; 428/694; 428/900
[58] Field of Search ............ 428/694, 900, 329, 425.9, 428/522; 427/128, 372.2

[56] References Cited

U.S. PATENT DOCUMENTS

| | | |
|---|---|---|
| 4,004,997 | 1/1977 | Tsukamoto ........................ 428/329 |
| 4,070,522 | 1/1978 | Ogasa ................................. 428/336 |
| 4,368,238 | 1/1983 | Somezawa et al. ................ 428/413 |
| 4,400,498 | 8/1983 | Konishi et al. .................... 528/60 |
| 4,405,684 | 9/1983 | Blumentritt et al. .............. 428/336 |
| 4,407,901 | 10/1983 | Miyatsuka et al. ................ 428/694 |
| 4,536,451 | 8/1985 | Shen ................................... 428/900 |
| 4,637,964 | 1/1987 | Shimuzu ............................. 428/900 |
| 4,647,506 | 3/1987 | Colon ................................. 428/522 |
| 4,689,269 | 8/1987 | Mukai ................................. 428/900 |

Primary Examiner—Paul J. Thibodeau
Attorney, Agent, or Firm—Donald M. Sell; Walter N. Kirn; Douglas B. Little

[57] ABSTRACT

A magnetic recording medium is provided with a layer comprised of finely divided particles dispersed in a binder comprised of a particular crosslinked dispersing polymer based on a vinyl aromatic monomer and having a degree of polymerization greater than about 100. The layer may be on a flexible, semi-rigid, or rigid support base. A stable-fluid, reactive dispersion of finely divided magnetic particles in a crosslinked dispersing polymer having a degree of polymerization greater than 100 which can be mixed with a crosslinker to provide a curable composition useful in preparing the magnetic recording medium. The curable composition also preferably contains multi-hydroxyl-functional polyurethane as a soft-component contributing cobinder resin.

17 Claims, No Drawings

MAGNETIC RECORDING MEDIA AND A METHOD USING A STABLE FLUID REACTIVE DISPERSION IN PREPARING MAGNETIC RECORDING MEDIA

FIELD OF THE INVENTION

This invention relates to a magnetic recording medium. In one aspect, this invention relates to a magnetic recording medium comprised of finely divided magnetic particles dispersed in a particular binder. In another aspect, this invention relates to the use of a reactive dispersion of finely divided magnetic particles useful in preparing magnetic recording media.

BACKGROUND OF THE INVENTION

The properties required of the binder for a magnetic recording medium require precise synthesis of the binder materials. First and foremost of the properties required is the ability of the binder to maintain the extremely small magnetic particles in a fixed position which permits them to be magnetized, demagnetized and to impart a strong, modulated magnetic signal over long exposure to environmental and mechanical stresses. This ability requires physical properties of the binder such as tensile strength, flexibility with high modulus and surface energy properties which promote dispersion and wettability which, to some extent, are mutually exclusive. In order to achieve overall balanced performance, compromises are made which permit acceptable limits of performance while optimizing specific properties such as modulus or wettability. In magnetic "tape" construction, properties such as flexibility are optimized. In magnetic "disk" construction, hardness and durability can more easily be optimized because less stress is put on flexibility.

As magnetic media have become more sophisticated and as the magnetic particles which the binder is required to hold in rigid and intimate contact become extremely small with geometrical designs which enhance magnetic strength, the role of the binder becomes even more critical.

Binder formulation is further complicated by the fact that in order to make the storage of magnetic tape less bulky, the substrate, which is usually a highly oriented polyester film, has been made thinner and thinner in each succeeding generation of tape products. As a result, the polymeric binder, whose prime function is to maintain the magnetic particle in fixed position, is required to assume part of the function of the substrate, i.e., contribute to the mechanical properties of the magnetic media such as flexural modulus and tensile strength. This is so because with thicker substrates, the modulus and the tensile strength of the composite were provided by the substrate. In modern tapes with thinner substrates, the binder will substantially contribute to these properties of the composite.

To balance the rigidity needed of modern binders with the flexibility needed to respond to the requirements of recording mechanisms, hard or rigid polymers are combined with soft or compliant polymers to achieve optimum performance. Furthermore, when the binder polymeric segments are judiciously selected, they can be very fluid, readily coated and cured by crosslinking to the desired state.

U.S. Pat. No. 4,405,684 to Blumentritt et al. discloses a rigid magnetic recording medium having finely divided magnetic particles dispersed in a thermosetting resin binder which is comprised of a blocked isocyanate having at least three reactive sites per chain and an oligomer having at least two hydroxy reactive sites per polymer chain and a molecular weight of 200 to 800 per hydroxy site. The patent discloses the incorporation of a high functionality rigid polymer segment such as a low molecular weight styrene-allyl alcohol copolymer to improve the hardness of binders which are also comprised of hydroxyl-terminated polyesters. The object of the invention taught in the patent is to provide resin binder systems having long pot-life and capable of achieving strong adhesion to a rigid substrate (such as an aluminum disc) used in the recording medium and to that end, blocked isocyanates are disclosed as crosslinking agents of the binder. The binder resin systems taught cannot be used in conventional flexible media due to thermal distortion and/or degradation of the flexible support base upon exposure to the temperatures needed to activate a blocked isocyanate.

U.S. Pat. No. 4,407,901 to Miyatsuka et al. discloses a magnetic recording medium comprising a non-magnetic base bearing a layer mainly consisting of ferromagnetic particles and a binder wherein the magnetic layer contains a copolymer having a polar functional group and a degree of polymerization of not more than 100. Examples of polar functional groups are carboxyl groups, hydroxyl groups, phenolic-OH groups, and sulfonic acid groups. The carboxyl groups and phenolic-OH groups of the polymers disclosed in the only specific examples react with polyisocyanate crosslinking agents at ambient conditions only at undesirably slow rates.

SUMMARY OF THE INVENTION

This invention relates to a magnetic recording medium comprising:
(a) a non-magnetic support base having two opposing major surfaces, and
(b) a magnetizable or non-magnetizable layer on at least a portion of at least one of said major surface, wherein at least one of said magnetizable and non-magnetizable layers is comprised of a finely divided particulate solid and a crosslinked binder mixture therefor, which crosslinked binder mixture is comprised of at least 5 weight percent of a dispersing polymer having a degree of polymerization greater than about 100 comprised of units derived from:
(i) one or more vinyl aromatic monomers, and one or more ethylenically unsaturated monomers, having aliphatic hydroxyl functionality, or
(ii) one or more vinyl aromatic monomers having hydroxyl functionality,
which polymer assists in dispersing said particulate solid in said layer and which is crosslinked into said binder.

This invention also relates to a method of preparing magnetic media comprising forming a stable, fluid reactive dispersion comprising a finely divided particulate solid and a crosslinkable dispersing polymer as described above having a degree of polymerization of more than about 100, mixing said reactive dispersion with a crosslinker to form a coatable mixture, and coating a non-magnetic support base with said coatable mixture. The use of the crosslinkable dispersing polymer in preparing the magnetic media of this invention provides a magnetic layer wherein the particulate solid and the reactive dispersant associated therewith are uniformly and securely dispersed within a binder matrix thereby improving the resistance to movement of the particles and dispersant within the binder matrix. The reactive dispersion can be used to make either flexible or rigid magnetic recording media.

The polymeric binder is preferably a combination of a "hard" component derived from the crosslinkable dispersing polymer and a "soft" component which when properly synthesized contribute to the effectiveness of the magnetic coating as a recording medium.

As used herein, a "crosslinked binder mixture" shall mean the mixture of crosslinkable binder resins, including both hard-component and soft-component resins, and the crosslinker therefor. When calculating the weight percent of a component of the crosslinked binder mixture, the weight of the finely divided particulate solid, suspending aids, lubricants and the like are not included as part of the weight of the crosslinked binder mixture.

The finely divided particulate solid can be a finely divided magnetic material or other functional particles such as titanium dioxide and/or an electrically-conductive form of carbon. In a particularly preferred embodiment, the flexible nonmagnetic support base is a tape, the tape carrying, on one surface, a magnetizable layer having magnetic particles in the binder described above and carrying, on the opposing surface, a non-magnetizable layer and titanium dioxide and electrically-conductive carbon particles in the binder described above. For floppy disk applications, a magnetic layer of this invention may be present on both the major surfaces thereof, i.e., as a double-coated floppy disk.

DETAILED DESCRIPTION OF THE INVENTION

The present invention provides magnetic recording media such as magnetic tapes, floppy disks, and rigid disks. The magnetic recording media of this invention are preferably manufactured from the reactive dispersions of this invention, i.e., compositions consisting essentially of finely divided magnetic particles and a crosslinkable dispersing polymer, but can be manufactured without first combining the polymer and magnetic particles. The reactive dispersions of this invention can be used to manufacture either flexible or rigid magnetic media, depending upon the nature of the nonmagnetic base and the other components of the binder.

The reactive dispersions of this invention are prepared by mixing the dispersing polymer with the finely divided magnetic particles. The mixture also contains one or more solvents to fluidize the mixture for ease of mixing and, preferably, wetting agents and suspending aids. The mixture need then be subjected to only moderate mixing forces, e.g., a Shar mixer at 4200 rpm for 2 to 4 hours, to prepare a smooth reactive dispersion of this invention. Suitable solvents include ketones, e.g., methyl ethyl ketone and/or cyclohexanone, and aromatic hydrocarbons, e.g., toluene. Suitable wetting agents include phosphoric acid esters such as monophosphorylated propylene oxide adducts of glycerine, e.g., the reaction product of 1 mole of phosphorus oxychloride with the reaction product of 10-11 moles of propylene oxide and 1 mole of glycerine. Suitable suspending aids include quaternary ammonium acetates or phosphates such as those available as Emcol TM acetate or phosphate from Witco Chemical Co.

As noted above, the binder of the magnetic layer is preferably prepared from the reactive dispersion described above, but it can be prepared from a formulation wherein the finely divided magnetic particles are not pre-dispersed in the crosslinkable dispersing polymer.

The magnetic recording medium of this invention is comprised of finely divided magnetic particles dispersed in a binder. For flexible magnetic recording media, i.e. magnetic tape and floppy disks, the binder should be flexible. The elongation of the crosslinked binder mixture itself without the finely divided magnetic particles dispersed therein has been found to correlate well with the flexibility of the cured binder having the finely divided magnetic particles dispersed therein. Accordingly, the preferred flexible crosslinked binder mixtures of the present invention have an elongation of at least about 5%, preferably at least about 10%, as measured by ASTM D-412-80 and D-638-82 so that the magnetic recording medium will be flexible, rather than rigid. For certain applications, the elongation of the binder is even greater, i.e., at least about 25% and preferably greater than 100%.

The binder is comprised of a crosslinked polymer comprised of units derived from group (i) one or more vinyl aromatic monomers and one or more ethylenically unsaturated monomers copolymerizable with the vinyl aromatic monomer said ethylenically unsaturated monomer having aliphatic hydroxyl functionality after polymerization with the vinyl aromatic monomer or from group (ii) one or more vinyl aromatic monomers having hydroxyl functionality. This polymer, when used in the binder at proper concentrations, will yield a flexible but hard magnetic medium which has low stiction, high modulus and an ultra smooth surface. Further, the dispersibility of the finely divided magnetic particles in the dispersing polymer is such that higher solids coatings can be obtained with shorter mill cycles as compared with conventional polymeric binders.

As to the polymers of group (i) comprised of repeating units derived from a vinyl aromatic monomer and an ethylenically unsaturated monomer having aliphatic hydroxyl functionality, examples of suitable vinyl aromatic monomers from which the dispersing polymer may be derived include styrene, vinyl toluene, alpha-methylstyrene, vinyl xylene and the like. Examples of suitable comonomers include allyl alcohol, vinyl alcohol, 3-hydroxy-1-butene, 4-hydroxy-1-butene, 2-hydroxyethyl acrylate, 2-hydroxypropyl acrylate, vinyl glycolate, and the like.

Alternatively, the dispersing polymer is comprised of units derived from a vinyl aromatic monomer having hydroxyl functionality. Examples of such monomers include vinyl phenols such as p-vinyl phenol and the like, vinyl cresols such as p-vinyl-m-cresol and the like, and p-hydroxy-alpha-methylstyrene and the like. Polymers which fall into both groups (i) and (ii), e.g., copolymers of ethylenically unsaturated monomers having aliphatic hydroxyl functionality or vinyl aromatic monomers and vinyl aromatic monomers having hydroxyl functionality and terpolymers of the three monomers of both groups (i) and (ii) are also within the scope of this invention.

The dispersing polymer can also contain units derived from other ethylenically unsaturated monomers. Particularly preferred other ethylenically unsaturated monomers, hereinafter referred to as highly-polar comonomers, include those having one or more functional groups having higher polarity than an aliphatic hydroxyl group, e.g. carboxylic acid, phosphonic acids, sulfonic acids, and salts of each, particularly alkali metal salts such as sodium and potassium. Dispersing terpolymers derived from these highly-polar comonomers result in superior reactive dispersions. Examples of highly-polar comonomers which contribute these additional groups include methacrylic acid, 2-acrylamido-2-methyl-propanesulfonic acid, 2-acrylamido-2-methyl-propanephosphonic acid, styrene-sulfonic acid, methacryloylpropanesulfonic acid, and the alkali metal, e.g., sodium or potassium, salts of each. The precise amount of these highly-polar comonomers may vary, but will generally range from about 2% to about 10% by weight of the dispersing polymer. At levels significantly below about 2%, the dispersing terpolymer fails to exhibit an improved quality dispersion over that of a dispersing copolymer. At levels significantly higher than about 10%, the dispersing terpolymer causes aggregation of the particulate solids in the dispersion.

The degree of polymerization of the dispersing polymer is greater than about 100. The degree of polymerization of the polymer is preferably controlled so that the molecular weight of the copolymer will range from about 10,000 to about 300,000. The amount of the hydroxyl functional comonomer of the polymers of group (i) will be from about 10 to about 80 percent by weight of the copolymer.

The precise amount of crosslinkable dispersing polymer as a percentage of the binder resins may vary, but significant, i.e., greater than nominal amounts, maximize the benefits that are realized in terms of both the quality of the dispersion and the mechanical properties of the binder. In general, the dispersing polymer is preferably present in an amount not less than 5 percent by weight of the crosslinked binder mixtures, preferably from about 10 to about 30 percent.

Three preferred classes of dispersing copolymers useful in this invention are described in more detail below.

1. Styrene-Hydroxyalkyl Acrylate Copolymers

These are preferably made by free radical polymerization using a thermally activated initiator such as 1,1'-azobiscyclohexanecarbonitrile (available as VAZO ™ 88 from DuPont). The conditions can be optimized to obtain nearly quantitative conversion (approx. 99%) in dry 2-butanone, making it possible to use this solution directly in the formulation. The percent styrene can be varied widely, preferably from 65 to 80 (too high of a percent of the polar monomers would cause the coating to be water sensitive) and the molecular weight has been varied from 5,000 to 100,000 (see Table 1, below, wherein all the quoted molecular weight were obtained by gel permeation chromatography using polystyrene standards). Evaluation of selected samples show that these polymers have good miscibility with polyurethanes to form composites having fast cure rates and high moduli, ofter higher than comparable low molecular weight polymers (see Table 3 below). The magnetic and surface properties (see Table 4 below) were also good.

2. Styrene-Vinyl Alcohol Copolymers

Poly(styrene-co-vinyl acetate) is preferably made by free radical polymerization techniques in a solvent, e.g., 2-butanone, and a free radical initiator, e.g. VAZO ™ 88 available from duPont. This vinyl acetate copolymer is then completely base-hydrolyzed (as detected, for example, by the complete disappearance of the carbonyl peak in the infrared spectrum at 1754 cm$^{-1}$ and the $^{13}$C NMR spectrum at 176.3 ppm from tetramethyl silane) in a solvent such as aqueous dioxane to give a random copolymer of styrene and vinyl alcohol. When these copolymers are put into formulations, tapes with good cures and high modulus are obtained.

3. Styrene-Allyl Alcohol Copolymers

Styrene-allyl alcohol copolymers having higher molecular weights than commercially available styrene-allyl alcohol copolymers, e.g., those available from Monsanto as RJ-100 and RJ-101 can be synthesized by the free radical polymerization of styrene and methyl acrylate to form poly(styrene-co-methyl acrylate) which can then be chemically reduced, e.g. with lithium aluminum hydride, to yield poly(styrene-co-allyl alcohol).

The dispersing polymers described above, provide hydroxyl sites which enable crosslinking by means of reaction with the crosslinkers useful in this invention. Examples of suitable crosslinkers include polyisocyanates, polyaziridines, and the like. Preferred crosslinkers are polyisocyanates which will react with the aliphatic hydroxyl groups of the dispersing polymer to form urethane crosslinks in the cured binder. The preferred crosslinkers will have a crosslinking functionality between about 2 and about 4. A particularly preferred crosslinker is a triisocyanate available from Mobay as CB-60 or 75.

The dispersing polymer described above is a hard-component contributor in a polymeric binder formulation, i.e., a binder prepared from such a copolymer alone would be hard, but may be too brittle for many applications. Accordingly, it is preferred to use an additional cobinder polymer or resin, preferably hydroxy-functional, to contribute a soft segment to the polymeric binder matrix and thereby toughen the binder. Examples of other suitable cobinder resins include multi-hydroxy-functional urethanes as described in U.S. Pat. Nos. 4,368,238 and 4,400,498, incorporated herein by reference.

These resins are obtainable by the polymerization of a long chain diol (A) having a molecular weight ranging from about 500 to 3,000, an organic diisocyanate (C) and a short chain triol (D) having a molecular weight lower than about 500 and, if desired, a short chain diol (B) having a molecular weight ranging from about 50 to 500.

More particularly, preferred resins of this type comprise a combination of units represented by formulas (I):

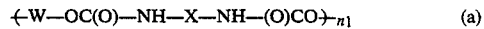   (a)

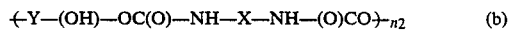   (b)

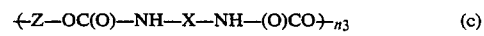   (c)

wherein
W is a residue derived by the elimination of the two hydroxyl groups from a long chain diol (A) having a molecular weight in a range of about 500 to 3,000;
X is a residue derived by the elimination of the two isocyanate groups from an organic isocyanate (C);
Y is a residue derived by the elimination of the two hydroxyl groups from a short chain triol (D) having a molecular weight in the range lower than about 500;

Z is a residue derived by the elimination of the two hydroxyl groups from a short chain diol (B) having a molecular weight in a range of about 50 to 500;

$n_1$ and $n_2$ are each a positive integer; and $n_3$ is 0 or a positive integer.

The long chain diol (A) to be employed for the thermoplastic polyurethane resin has a molecular weight in the range from about 500 to 3,000 and may include, for example, a polyester diol, a polyether diol, a polyether ester glycol and the like.

The polyester diol may include, for example, a polyester diol obtainable by the reaction of an aliphatic dicarboxylic acid such as succinic acid, adipic acid, sebacic acid, azelaic acid or the like; an aromatic dicarboxylic acid such as terephthalaic acid, isophthalic acid or the like; a lower alcohol ester, such as methyl or ethyl ester, of the carboxylic acid with a glycol such as ethylene glycol, 1,3-propylene glycol, 1,4-butylene glycol, 1,6-hexane glycol, diethylene glycol, 1,4-cyclohexanedimethanol, neopentyl glycol or the like, an ethylene oxide adduct of bisphenol A or the like or a mixture thereof with a polyester diol of the lactone type obtained by the cleavage polymerization of a lactone such as ε-caprolactone or the like. The polyether diol may include, for example, a polyalkylene ether glycol such as polyethylene glycol, polypropylene ether glycol, polytetramethylene ether glycol or the like, and a polyether glycol obtainable by the copolymerization of these glycols. The polyether ester glycol may include, for example, a polyester ether glycol obtainable by the reaction of the aforesaid polyalkylene ether glycol with an aliphatic or aromatic dicarboxylic acid as hereinabove enumerated as the polyol component.

In magnetic tape applications, the multi-hydroxyl-functional polyurethane resin used in preparing a coating for the backside is preferably prepared with a long chain diol having a molecular weight greater than about 500 and less than about 1000. It has been found that these lower molecular weight long chain diols yield backside binder coatings having properties superior to those wherein the long chain diol has a molecular weight of 1000 g/mole or greater.

The short chain diol (B) to be optionally used for the thermoplastic polyurethane resin has a molecular weight in the range from about 50 to 500 and may include, for example, an aliphatic glycol such as ethylene glycol, propylene glycol, 1,4-butylene glycol, 1,6-hexane glycol, 1,4-cyclohexanedimethanol, neopentyl glycol or the like or an aromatic diol such as ethylene oxide adduct or propylene oxide adduct of bisphenol A, ethylene oxide adduct of hydroquinione or the like. The short chain diol (B) may be used singly or in admixture with each other.

The organic diisocyanate (C) to be used for the thermoplastic polyurethane resin may include, for example, an aliphatic diisocyanate, an aromatic diisocyanate or an alicyclic diisocyanate such as hexamethylene diisocyanate, isophorone diisocyanate, dicyclohexylmethane diisocyanate, methylcyclohexane diisocyanate, toluene diisocyanate, 4,4'-diphenylmethane diisocyanate, ditoluene diisocyanate, paraxylene diisocyanate, naphthalene diisocyanate, dianisidine diisocyanate, xylylene diisocyanate or the like. The diisocyanates (C) may be employed singly or in admixture with each other.

The short chain triol (D) to be used for the thermoplastic polyurethane resin has a molecular weight in the range of less than about 500. Specific examples include the following compounds: glycerine, ethylene oxide adduct of glycerine, ethylene oxide adduct of glycerine, 2-methyl-propane-1,2,3-triol, 4-[bis(2-hydroxyethyl)]-2-hydroxypentane, 3-methylpentane-1,3,5-triol, and 1,2,6-hexanetriol, 1-bis(2-hydroxyethyl)-amino-2-propanol(N-isopropanol diethanolamine), propylene oxide adduct of diethanolamine, and ethylene oxide adduct of N-isopropanoldiethanolamine.

The thermoplastic polyurethane resin may be prepared by subjecting the long chain diol (A), the short chain triol (D) and the organic diisocyanate (C), and optionally, the short chain diol (B) to a polymerization reaction. The polymerization may be carried out by a known method: for example, a one-shot method in which all the components are simultaneously reacted with each other in solution. It is also convenient to use a modified one-shot method in which all the (A), (B), (C) and (D) reactants are charged together, with the exception of a portion of isocyanate (C) which is reserved. This reserved portion is then added to the reaction mixture after the originally charged isocyante (C) is consumed preferably in increments.

The weight ratio of soft-component contributing cobinder resin to hard-component contributing resin will preferably range from about 4:1 to 1:4. To balance the rigidity contributed to the binder by the dispersing copolymer, other hard-component resins such as vinyl resins and nitrocelluloses can be blended wth the dispersing copolymer at a ratio between 1:4 and 4:1 by weight to modify the hard segment as it is blended with the soft-segment crosslinkable resins.

Suitable examples of vinyl resins which can be used in the present invention are vinyl chloride/vinyl acetate copolymers, vinyl chloride/vinylidene chloride copolymers, vinyl chloride/acrylonitrile copolymers, vinylidene chloride/acrylonitrile copolymers, polyvinyl butyral. These polymers preferably contain functional groups which strengthen adsorption of the binder on magnetic materials. Preferred examples of such functional groups include a hydroxyl group and a carboxyl group. Particularly preferred examples include a vinyl chloride/vinyl alcohol copolymer, a vinyl chloride/maleic acid copolymer, a vinyl chloride/vinyl acetate/vinyl alcohol copolymer, a vinyl chloride/vinyl acetate/maleic acid copolymer, a vinyl chloride/vinyl alcohol/maleic acid copolymer, a vinyl chloride/vinyl acetate/vinyl alcohol/maleic acid copolymer.

The finely divided magnetic particles used in this invention may include the particles of magnetic oxides, such as, gamma-$Fe_2O_3$, $Fe_3O_4$, a mixture of gamma-$Fe_2O_3$ with $Fe_3O_4$, $CrO_2$, barium ferrite, or Berthollide compound and particles of ferromagnetic metals or ferromagnetic alloys such as Fe, Fe—Co, Co—Ni, Co—Cr, Fe—Co—Ni, Fe—Co—B, Fe—Co—Cr—B, Fe—Co—V, or iron nitride.

When the binder is to be used as a backside coating for a magnetic tape, a finely divided electrically-conductive form of carbon can be included to reduce the build-up of static electricity. Alternatively, or in addition to the electrically-conductive carbon, titanium dioxide or other inorganic fillers can be included in the backside.

Preparation of Recording Medium

The magnetic recording medium of this invention is preferably prepared by first preparing a stable-fluid, reactive dispersion of the finely divided particulate solid in a composition comprised of the dispersing polymer having hydroxyl functionality. The stable dispersions are preferably prepared by mixing the crude particulate solid into a mixture comprised of solvent, wetting agent, and suspending agent. At least a portion of the crosslinkable dispersing polymer is then added to form a wetted slurry. The wetted slurry is then milled until the average particle size of the crude magnetic particles is small enough such that the dispersion exhibits the desired smoothness. A soft-component contributing cobinder resin along with any remaining dispersing polymer and additional fluidizing solvents can be added either before or after milling. The milling process will yield a stable dispersion of finely divided magnetic particles dispersed in a fluidizing solvent, the dispersing polymer contributing to the quality of the dispersion. The use of the dispersing polymer allows for more efficient production, i.e., fewer milling cycles, of a coatable particle/binder composition having a quality of dispersion equivalent to that of particle/binder compositions without the dispersing resin, but made with a greater number of milling cycles. This stable dispersion is then mixed with the crosslinker to form a curable composition.

The curable composition can then coated on a non-magnetic support base and allowed to cure. The coating is preferably surface-treated prior to, or after, curing by well-known techniques of calendering, polishing and/or burnishing.

A preferred flexible support base is comprised of a film of synthetic polymer having desired degrees of flexibility and tensile strength. An example of a preferred flexible support base is a polyethylene terephthalate tape backing having a thickness from about 8 micrometers to about 80 micrometers.

Because the preferred flexible support bases, e.g., polyethylene terephthalate tape, should not be exposed for prolonged periods to temperatures above about 100° C., the curable compositions prepared for use on flexible support bases should be curable to the desired degree at a temperature below about 100° C. Accordingly, when preparing flexible magnetic media, the crosslinker chosen as a component of the curable composition should be sufficiently reactive with the dispersing copolymer and other crosslinkable binder polymers to crosslink the system to the desired degree at temperatures below about 100° C., more preferably at ambient temperatures. In this respect, the crosslinker used in preparing flexible magnetic media should be a free polyisocyanate, rather than blocked isocyanates which require temperatures above about 100° C. to cure the binder resin system. Blocked polyisocyanates are known in the art as compounds having multiple isocyanate groups which have been reacted with a blocking compound, e.g., a ketoxime, such that the blocking reaction is reversible at elevated temperatures.

The magentic medium of this invention is useful for recording magnetic signals when used with a variety of magnetic signal generating devices, e.g., in video tapes, computer tapes and diskettes, and the like.

EXAMPLES

Starting Materials

General Preparation of Styrene Copolymers

The reaction is carried out in a 1 quart polymerization bottle to which calculated amounts of styrene and the comonomer (e.g. hydroxy ethyl acrylate or vinyl acetate or methyl acrylate, etc.) are charged. A measured volume of previously dried solvent (e.g. 2-butanone or ethyl acetate or tetrahydrofuran or toluene, etc.) was charged to the polymerizaton bottle prior to the charging of the monomers. Immediately following the monomer charge, a free radical initiator, preferably 1,1' azo-bis-cyclohexanecarbonitrile (available from duPont as VAZO ™ 88), a chain transfer agent (e.g. t-dodecyl mercaptan) are added and the homogenous solution is purged with nitrogen to expel the oxygen present. The closed reaction bottle is then placed in a launderometer rotating agitator for 3 to 5 days at 75° C. The resulting copolymer is essentially completely converted and can be used without further purification to become the polymeric dispersant for magnetic binders.

Preparation of Styrene-Hydroxyethyl Acrylate Copolymer

The reaction is carried out in a 1 quart polymerization bottle charged with 70 ml of dry 2-butanone, 23 g. of purified styrene monomer, 7 g. of purified hydroxy ethyl acrylate monomer which were charged sequentially. This charging was followed by addition of 0.18 g. of VAZO ™ 88 initiator, 4 drops of t-duodecyl mercaptan chain transfer agent. At this point, the homogeneous solution is vigorously purged with a stream of nitrogen then quickly closed, taped and placed in a rotating launderometer agitator maintained at 75° C. for three days. The resulting copolymer is essentially completely converted and ready to be used as a polymeric dispersant.

Preparation of Styrene-Allyl Alcohol Copolymer

The reaction is carried out in a 3-neck flask equipped with condenser, nitrogen inlet, mechanical stirrer, heating mantle and temperature control. The initial charge of 12 g. of styrene-methyl acrylate copolymer is 100 ml of distilled, N-methyl morpholine was nitrogen purged then 1.3 g. of lithium aluminum hydride (LAH) in 100 ml of purified N-methyl morpholine was added dropwise to the polymer solution blanketed with nitrogen. Stirring was maintained for two hours then the mixture was heated to reflux for ½ followed by cooling when 10 g. of sodium potassium tartrate in 50 ml of water was added. The reaction was heated to reflux for ½ hour. At this point the stirring was discontinued, the reaction was cooled and the supernatant organic layer containing the styrene-allyl alcohol copolymer decanted from the hard inorganic precipitate. The product structure was confirmed by spectroscopic analyses.

Preparation of Styrene-Vinyl Alcohol Copolymer 12 g. of styrene-vinyl acetate (prepared by General Preparation proceudure described above) were dissolved in 150 ml of dioxane in a reaction flask equipped as described above. To this was added 1.05 g of sodium hydroxide in 15 ml of water. The reaction was heated to reflux overnight. The resulting styrene-vinyl alcohol copolymer was obtained by precipitation in methanol, washed successively with water and excess methanol then dried overnight in a vacuum oven. The product was identified by spectroscopic analyses.

The following reactive dispersants, shown in Table 1, below, were prepared by the procedures described above with the necessary variations. In Table I, the following abbreviations have the following meanings:
STY=styrene
HEA=2-hydroxyethyl acrylate
HPA=2-hydroxypropyl acrylate
AOH=allyl alcohol VOH=vinyl alcohol
MA=methacrylic acid
PM=2-methylamido-2-methylpropanephosphoric acid
SM=2-acrylamido-2-methylpropanesulfonic acid
SSS=sodium styrenesulfonate
SPK=sulfopropylmethacrylate, potassium salt
VP=vinyl phenol

TABLE 1

Characteristics of Dispersing Polymers

| Polymer | Styrene (wt %) | $M_n$ | $M_w$ | Poly-dispersity | Tg °C. |
|---|---|---|---|---|---|
| STY—HEA | 64 | 99,256 | 330,224 | 3.3 | |
| STY—HEA | 77 | 65,156 | 162,027 | 2.5 | |
| STY—HEA | 77 | 69,410 | 164,960 | 2.4 | |
| STY—HEA | 77 | 71,538 | 180,982 | 2.5 | |
| STY—HEA | 77 | 64,674 | 171,632 | 2.7 | |
| STY—HEA | 77 | 58,232 | 190,081 | 3.3 | |
| STY—HEA | 77 | 51,568 | 192,279 | 3.7 | |
| STY—HEA | 74 | 43,076 | 107,759 | 2.5 | |
| STY—HEA | 74 | 45,252 | 117,832 | 2.6 | 86 |
| STY—HEA | 74 | 43,717 | 116,425 | 2.7 | |
| STY—HEA | 64 | 31,354 | 87,781 | 2.8 | |
| STY—HEA | 74 | 6,831 | 17,247 | 2.5 | |
| STY—HEA | 74 | 5,803 | 13,906 | 2.4 | 51 |
| STY—HEA | 74 | 7,089 | 17,397 | 2.5 | 54 |
| STY—HEA | 74 | 5,957 | 14,045 | 2.4 | |
| STY—AOH | 80 | 11,804 | 55,957 | 4.7 | 101 |
| STY—AOH | 68 | | | | 89 |
| STY—AOH | 80 | | | | 94 |
| STY—VOH | 87 | 21,218 | 45,684 | 2.2 | 104 |
| STY—VOH | 87 | 23,402 | 48,644 | 2.1 | 104 |
| STY—VOH | 87 | 17,729 | 38,479 | 2.2 | 103 |
| STY—HPA—SM | — | — | — | — | — |
| STY—HPA—PM | — | — | — | — | — |
| STY—HPA—MA | — | — | — | — | — |
| STY—HPA | — | — | — | — | — |
| VP | — | 30,000 | — | — | 159 |

Multi-Hydroxyl-Functional Urethanes (MHFU)

The multi-hydroxyl-functional urethanes used as soft-component contributing cobinder resins in the examples below are described below.

Multi-Hydroxyl-Functional Urethane-I (MHFU-I)

This multi-hydroxy polyurethane was prepared by carrying out the reaction in a 22-liter, three-neck reaction flask, heated by a variac-controlled heating mantle, fitted with thermometer, mechanical stirrer, and a condenser with means for introducing nitrogen to maintain an inert atmosphere within the reaction flask. An initial charge of 1,033 g of 4,4' methylene-bis-(cyclohexyl) diisocyanate (H-MDI), 191.7 g of 1,4-cyclohexanedimethanol, 1,902.7 g of polytetramethyleneoxide diol having a molecular weight of about 650 g/mol (available from duPont as TERACOL TM 650), 110.2 g of glycerol, 5,244 g of methyl ethyl ketone and 1.7 g of dibutyltin dilaurate was introduced into the 22-liter reaction flask, which had first been flushed with nitrogen. The nitrogen atmosphere was maintained throughout the reaction. The mixture was heated at reflux temperature until no isocyanate was detectable by infrared spectroscopic examination. This occurred after about an hour of refluxing. At this point an inherent viscosity in methyl ethyl ketone of about 0.15 had been reached. Additional chargings of the remaining 259 g of H-MDI in increments were made followed by refluxing until the desired inherent viscosity of 0.23 was reached. A sample of multi-hydroxy functional polyurethane (MHFU-I) exhibited a glass transition temperature (Tg) of −32° C., a weight average molecular weight of 43,652, a number average molecular weight of 12,366 and a hydroxyl equivalent weight of 1,601.

Multi-Hydroxyl-Functional Urethane-II (MHFU-II)

The preparation of this multi-hydroxy-functional urethane was carried out in a 22-liter, three-neck reaction flask heated by a variac-controlled heating mantle and fitted with a thermometer, mechanical stirrer, and a condenser with a means for introducing and maintaining an inert nitrogen atmosphere above the reactant mixture. A charge of 673.6 g of isophorone diisocyanate, 1300 g of a polytetramethyleneoxide diol having a molecular weight of about 1000 g/mol (available from duPont as Teracol TM 1000), 305.6 g of 1,4 cyclohexanedimethanol, 28.08 g of glycerol, 3,460 g of methyl ethyl ketone and 0.46 g of dibutyltin dilaurate was introduced into the 22-liter reaction flask which had first been flushed with nitrogen and the nitrogen atmosphere was maintained. The mixture was heated at reflux temperature under nitrogen atmosphere until no isocyanate was detectable by infrared spectroscopic examination. This required about one hour of heating at reflux. At that point the inherent viscosity determined in methyl ethyl ketone solution was 0.15. An additional charge of 75.01 g of isophorone diisocyanate were made and heating at reflux temperature was continued for one hour at which time no isocyanate was detectable by infrared spectroscopic examination. The inherent viscosity was now 0.21. Charging of isophorone diisocyanate increments was continued until an inherent viscosity of from 0.23 to 0.33 was achieved. A sample of the resulting polyurethane exhibited a glass transition temperature of −32° C., a weight average molecular weight of 45,092 and a hydroxyl equivalent weight of 3680.

Standard Formulating and Coating Procedure

A representative formulation for preparing flexible magnetic recording medium of this invention was prepared from a reactive dispersion of this invention as follows.

Reactive Dispersion

First, a slurry was prepared from the following components.

| Material | Amount by Wt in Grams | % Solids | Function |
|---|---|---|---|
| Cobalt doped magnetic gamma iron oxide | 25 | 84.7 | Magnetic pigment |
| Solvent blend (70% methyl ethyl ketone, 20% cyclohexanone, 10% Toluene) | 17 | — | Solvent |
| Phosphoric acid ester | 2.0 | 6.8 | Wetting agent |
| Quaternary Ammonium Phosphate (available as Emcol TM Phosphate from Witco Chemical Co.) | 0.5 | 1.7 | Suspending aid |

The above mixture was mixed in a water jacketed Shar mixer at 4200 rpm for about 3 hours. The resulting slurry was checked for smoothness by visual inspection for transmitted light under a 256 power microscope. A copolymer described in Table 2, below, was then added to the mixture in an amount of 1.10 g (3.59% by weight) and 2.2 g of MHFU-II (41.39%). The resulting mixture was mixed at 4800 rpm for an additional ½ hour. The mixture was then transferred to an Eiger mill where it was milled until it was smooth, e.g. 7 to 10 passes at approximately one and a half hours per pass.

Coatable Binder Composition the following ingredients were added to the reactive dispersion prepared above.

| Material | Amount by Wt in Grams | % Solids | Function |
|---|---|---|---|
| Butyl myristate | 0.13 | 0.44 | Lubricant |
| Myristic acid | 0.875 | 3.0 | Lubricant |
| Al$_2$O$_3$ dispersion | 0.2 | | Head cleaning agent |
| Trifunctional isocyanate (60% solids) (available from Mobay as CB-60) | —* | | Crosslinker |

*Sufficient for 130 Index. The tri-functional isocyanate charge is calculated by adding the number of Eqts (including those for the additional resin to be tested) times the "index" in percent (1.3 in this case), times the Eq. Wt. of CB-60 (405). This gives the grams of activator for that particular index.

The resulting mixture was homogenized with a Shar mixer to yield a coatable binder composition.

Tape Preparation

The coatable binder composition prepared above was coated at a thickness of 5 micrometers on a 35 micrometer thick poly(ethylene terephthalate) backing using a gravure roll coater. The resulting coating was then surface treated.

Examples 1-6

With the above standard formulation, the following dispersing polymers were evaluated. 1.10 g (3.59% by weight) were used with the formulation described above.

TABLE 2

| Example | Polymer | $M_n$ |
|---|---|---|
| 1. | Styrene—Hydroxyethyl Acrylate | 65,156 |
| 2. | Styrene-Hydroxyethyl Acrylate | 69,410 |
| 3. | Styrene-Hydroxyethyl Acrylate | 71,538 |
| 4. | Styrene-Hydroxyethyl Acrylate | 58,232 |
| 5. | Styrene-Hydroxyethyl Acrylate | 5,803 |
| 6. | Styrene-Vinyl Alcohol | 21,218 |

The tapes were made and their properties were measured. The thickness was obtained using a caliper. Table 3 gives the thicknesses of the magnetic coating and backing in micrometers. The modulus is given in kilopascal (kPa). The Ranta is a measure of isocyanate cure; the lower the Ranta, the higher the degree of cure. Both the modulus and Ranta were measured after 24 hours, after four days and again after seven days. The gloss is a measure of smoothness and reflectivity; 100+ is desirable. Solvent resistance is measured by the solvent swell with dimethyl formamide (DMF); 6+ is acceptable.

TABLE 3

PHYSICAL PROPERTIES OF MAGNETIC TAPES

| | | Thickness | | 24 Hour | | | 4 Days | | 7 Days | |
|---|---|---|---|---|---|---|---|---|---|---|
| Ex. | Polymer | Magnetic Coating (micrometer) | Film Substrate (micrometer) | Flexural Modulus (kPa × 10$^6$) | Solvent Swell | Ranta | Flexural Modulus (kPa × 10$^6$) | Ranta | Flexural Modulus (kPa × 10$^6$) | 45° Gloss |
| 1 | 1. | 7.3 | 23.3 | 5.5 | 6 + 1L | 0.015 | 6.7 | 0.016 | 6.7 | 100+ |
| 2 | 2. | 7.3 | 23.3 | 6.0 | 6 + 1L | 0.013 | 7.3 | 0.013 | 7.3 | 100+ |
| 3 | 3. | 7.0 | 22.2 | 5.6 | 6 + 1L | 0.011 | 6.3 | 0.013 | 6.3 | 100+ |
| 4 | 4. | 6.5 | 23.0 | 5.9 | 6 + 1L | 0.011 | 6.3 | 0.013 | 6.3 | 100+ |
| 5 | 5. | 8.0 | 23.0 | 5.4 | 6 + 1L | 0.013 | 5.9 | 0.020 | 6.2 | 100+ |
| 6 | 6. | 6.5 | 23.0 | 6.4 | 6 + 1L | 0.019 | 7.6 | 0.017 | 7.6 | 100+ |

The data in Tables 3, particularly the gloss data, shows that the dispersing polymers of this invention, even though they have high molecular weights, yield excellent dispersions.

Example 7 and Comparative Example A

Polymer 7, a styrene-allyl alcohol copolymer having a number average molecular weight of about 11,804, and comparative polymer A, a styrene-allyl alcohol copolymer having a number average molecular weight of about 960, available from Monsanto as RJ-100, were each evaluated in a representative formulation set forth in Table 4, below. Each polymer was added in an amount of 1.10 g solids to the formulation and the formulation and coating procedure was the same as that of Examples 1-6.

TABLE 4

Formulation Used To Evaluate Styrene-Allyl Alcohol Examples

| | Grams | Percent Solids | Percent Based On Pigment | Eq.[1] Wt. | No. of Eqs. |
|---|---|---|---|---|---|
| Cobalt doped gamma iron oxide | 25 | 100 | | | |
| Solvent Mix[2] | 16 | — | | | |
| Phosphoric acid ester | 1.33 | 75 | 4.0 | 560 | 0.00238 |
| Quaternary ammonium acetate | 0.50 | 100 | 2.0 | 1100 | 0.00045 |
| VAGH (32%) | 0.94 | 32 | 1.2 | 1915 | 0.00049 |
| MHFU-II(Binder) | 2.0 | 40 | 3.2 | 3400 | 0.00024 |
| Lubricant Solution[3] | 0.50 | 75 | 1.5 | | |
| Head Cleaning Agent | 1.25 | 63 | 3.2 | | |
| Tri-functional isocyanate Crosslinker (CB-60) (130 Index) | aprx. 3 | 60 | | 405 | |

[1]These Eq. Wts. are corrected for percent solids.
[2]70% MEK, 20% cyclohexanone, 10% toluene.
[3]50% butyl myristate, 25% myristic acid, 25% toluene.

The above formulation shown in Table 4 with polymer 7 is referred to as Example 7 and the formulation with comparative polymer A is referred to as Example A in Table 5, below.

TABLE 5

PHYSICAL PROPERTIES OF MAGNETIC TAPES FROM STYRENE-ALLYL ALCOHOL COPOLYMERS

| Example | $M_n$ of STY—AOH Polymer | Coating Thickness (Micrometers) | Coating Modulus (kPa × 10⁶) 24-Hour | 6-Day | Solvent Swell 24-Hour | 6-Day | Ranta 24-Hour | 6-Day | Gloss |
|---|---|---|---|---|---|---|---|---|---|
| A | 960 | 7.8 | 5.3 | 10.6 | 6 | 6 | 0.124 | 0.58 | 98 |
| 7 | 11,804 | 6.6 | 6.4 | 12.4 | 6 | 6 | 0.144 | 0.83 | 94 |

The coating modulus of the samples cured for 24 hours and 6 days show the superiority of the flexural modulus of Example 7 over Comparative Example A which indicates the tapes will have better mechanical properties. The comparable, acceptable gloss ratings indicate the particles have comparable degrees of dispersion. In view of the desire in the art to use thinner backings, the improvement in flexural modulus is important because it contributes a degree of stiffness to the tape that is no longer contributed by the thinner backings.

Homopolymers of Vinyl Phenol and HPA Copolymers and Terpolymers

The following polymers shown in Table 6 below, were evaluated in the formulation of Table 4 in the amounts shown in Table 6.

TABLE 6

| Polymer | Monomers | Mol. Wt. | Tg (°C.) | Wt. (g) | % solids |
|---|---|---|---|---|---|
| B | VP | 1,500–7,000 | 153 | 1.46 | 20.6 |
| 8 | VP | 30,000 | 159 | 1.4 | 20.6 |
| 9 | STY—HPA—SM | — | — | 1.66 | 36 |
| 10 | STY—HPA—PM | — | — | 1.80 | 33 |
| 11 | STY—HPA—MA | — | — | 2.12 | 28 |
| 12 | STY—HPA | — | — | 2.54 | 23.6 |

Tapes prepared using the above formulations had the properties shown in Table 7 below.

The tapes were made and their properties were measured as above. The modulus is given in kilopascals (KPa). The Ranta is a measure of isocyanate cure; the lower the Ranta, the higher the degree of cure. The modulus and Ranta were measured after 24 hours, three days and again after seven days. Solvent resistance is measured by the solvent swell with dimethyl formamide (DMF); 6 is acceptable.

mixture therefor, which crosslinked binder mixture is comprised of:
(1) at least about 5 weight percent of a hard component dispersing polymer having a degree of polymerization greater than 100 comprised of units derived from:
(i) one or more vinyl aromatic monomers and one or more ethylenically unsaturated monomers having aliphatic hydroxyl functionality, or
(ii) one or more vinyl aromatic monomers having hydroxyl functionality,
which polymer is crosslinked into said binder; and
(2) a soft-component contributing polymer which is a multi-hydroxyl-functional polyurethane; the weight ratio of hard-component contributing polymers to soft-component contributing polymers ranging from about 1:4 to 4:1.

2. A magnetic recording medium in accordance with claim 1 wherein said dispersing polymer is a copolymer comprised of units derived from the monomers of group (i).

3. A magnetic recording medium in accordance with claim 2 wherein the vinyl aromatic compound is styrene.

4. A magnetic recording medium in accordance with claim 2 wherein the ethylenically unsaturated monomer having aliphatic hydroxyl functionality is allyl alcohol.

5. A magnetic recording medium in accordance with claim 2 wherein the ethylenically unsaturated monomer having aliphatic hydroxyl functionality is 2-hydroxyethyl or 2-hydroxypropyl acrylate.

6. A magnetic recording medium in accordance with claim 2 wherein the ethylenically unsaturated monomer having aliphatic hydroxyl functionality is vinyl alcohol.

7. A magnetic recording medium in accordance with claim 2 wherein said dispersing polymer is further comprised of a monomer having one or more functional

TABLE 7

PHYSICAL PROPERTIES OF MAGNETIC TAPES

| Example | Polymer of Table 6 | 24 Hour Modulus kPa × 10⁶ | Solvent Swell | Ranta | 3 Days Modulus kPa × 10⁶ | Solvent Swell | Ranta | 7 Days Modulus kPa × 10⁶ | Solvent Swell | Ranta |
|---|---|---|---|---|---|---|---|---|---|---|
| B | B | — | — | — | 7.8 | 6 | 0.093 | 8.1 | — | 0.087 |
| 8 | 8 | — | — | — | 8.1 | 6 | 0.112 | 8.6 | — | 0.070 |
| 9 | 9 | 4.4 | 4 | — | — | — | — | 7.7 | 6 | 0.068 |
| 10 | 10 | 4.4 | 4 | — | — | — | — | 7.3 | 6 | 0.067 |
| 11 | 11 | 3.7 | 4 | — | — | — | — | 7.9 | 6 | 0.039 |
| 12 | 12 | 4.4 | — | — | — | — | — | 8.3 | 6 | 0.182 |

What is claimed is:

1. A magnetic recording medium, having a magnetizable layer and selected from tapes and diskettes comprising a flexible, non-magnetic support base having two opposing major surfaces wherein said magnetizable layer or a non-magnetizable layer on at least a portion of at least one of said major surfaces is comprised of a finely divided particulate solid and a crosslinked binder groups having greater polarity higher than an aliphatic hydroxyl group.

8. A magnetic recording medium in accordance with claim 7 wherein said functional groups are selected from the group consisting of carboxylic acid groups, phosphonic acid groups, sulfonic acid groups, and salts of each.

9. A magnetic recording medium in accordance with claim 1 wherein the crosslinked binder mixture is comprised of a polyisocyanate crosslinker.

10. A magnetic recording medium in accordance with claim 1 wherein said crosslinked binder mixture is comprised of from about 10 to about 30 percent by weight of said dispersing polymer.

11. A magnetic recording medium having a magnetizable layer and selected from tapes and diskettes comprising a flexible, non-magnetic support base having two opposing major surfaces wherein said magnetizable layer or a non-magnetizable layer on at least a portion of at least one of said major surfaces is comprised of a finely divided particulate solid and a crosslinked binder mixture therefor, which crosslinked binder mixture is comprised of a polyisocyanate crosslinker, a soft-component contributing multi-hydroxyl-functional polyurethane and at least about 5 weight percent of a hard component dispersing polymer having a degree of polymerization greater than 100 comprised of units derived from:
(i) styrene and one or more ethylenically unsaturated monomers having aliphatic hydroxyl functionality selected from the group consisting of hydroxyalkyl acrylates and allyl alcohol, or
(ii) vinyl phenol,
which polymer is crosslinked into said binder, wherein the weight ratio of hard-component binder resins to soft-component binder resins in said mixture is from about 1:4 to about 4:1.

12. A magnetic recording medium in accordance with claim 11 wherein said multi-hydroxyl-functional polyurethane is the polymerization reaction product of a mixture comprising a long chain diol having a molecular weight of from about 500 to 3000, an organic diisocyanate and a short chain triol having a molecular weight of less than about 500.

13. Improved method of preparing a flexible magnetic recording medium, having a magnetizable layer, wherein the improvement comprises making at least one layer of the recording medium by the following steps:
(a) forming a stable-fluid, reactive dispersion comprised of a finely divided particulate solid and:
(1) a hard-component dispersing polymer having a degree of polymerization greater than 100 comprised of units derived from:
(i) one or more vinyl aromatic monomers, and one or more ethylenically unsaturated monomers having aliphatic hydroxyl functionality, or
(ii) one or more vinyl aromatic monomers having hydroxyl functionality, and
(2) a multi-hydroxy-functional soft-component polyurethane, there being a weight ratio of hard to soft polymers in the dispersion of from 1:4 to 4:1
(b) mixing said dispersion with a crosslinker, and
(c) coating at least a porton of one major surface of a flexible, polymeric, non-magnetizable support base with said dispersion; and
(d) curing said dispersion at a temperature less than 100° C.

14. A magnetic recording medium having a magnetizable layer and selected from tapes and diskettes comprising:
(a) a flexible, non-magnetic support base having two opposing major surfaces, and
(b) a layer on one of said major surfaces, said layer being comprised of a finely divided particulate solid and a crosslinked binder mixture therefor, which crosslinked binder mixture is comprised of at least:
(1) about 5 weight percent of a hard-component dispersing polymer having a degree of polymerization greater than 100 comprised of:
(i) a copolymer of one or more vinyl aromatic monomers and one or more ethylenically unsaturated monomers having aliphatic hydroxyl functionality, or
(ii) a vinyl aromatic homopolymer having hydroxyl functionality,
which polymer is crosslinked into said binder; and
(2) a soft-component contributing polymer which is a multi-hydroxyl-functional polyurethane; the weight ratio of hard-component contributing polymers to soft-component contributing polymers ranging from about 1:4 to 4:1.

15. A magnetic recording medium in accordance with claim 14 wherein the vinyl aromatic monomer having hydroxyl functionality is vinyl phenol.

16. A magnetic recording medium, having a magnetizable layer, comprising:
(a) a non-magnetic support base having two opposing major surfaces, and
(b) a layer on one of said major surfaces, said layer being comprised of a finely divided particulate solid and a crosslinked binder mixture therefor, which crosslinked binder mixture is comprised of at least about 5 weight percent of a dispersing polymer having a degree of polymerization greater than about 100 comprising a copolymer of a monomer having at least one polar functional group selected from the group consisting of phosphonic acid groups, sulfonic acid groups and salts of each of each of the preceding, and:
(i) one or more vinyl aromatic monomers and one or more ethylenically unsaturated monomers having aliphatic hydroxyl functionality, or
(ii) one or more vinyl aromatic monomers having hydroxyl functionality.

17. A magnetic recording medium in accordance with claim 16 wherein said monomer having at least one polar functional group is selected from the group consisting of 2-acrylamido-2-methyl-propanesulfonic acid, 2-acrylamido-2-methyl-propanephosphonic acid, styrene sulfonic acid, and the alkali metal salts of each.

* * * * *